United States Patent [19]

Kantesaria et al.

[11] 4,325,327
[45] Apr. 20, 1982

[54] HYBRID FLUIDIZED BED COMBUSTER

[75] Inventors: Prabhudas P. Kantesaria, Windsor; Francis T. Matthews, Poquonock, both of Conn.

[73] Assignee: Combustion Engineering, Inc., Windsor, Conn.

[21] Appl. No.: 237,183

[22] Filed: Feb. 23, 1981

[51] Int. Cl.³ .............................................. F22B 1/00
[52] U.S. Cl. .................................. 122/4 D; 110/245; 110/106; 110/263
[58] Field of Search ............... 110/245, 106, 222, 263; 122/4 D

[56] References Cited

U.S. PATENT DOCUMENTS

| | | | |
|---|---|---|---|
| 2,282,370 | 5/1942 | McConechy | 110/228 |
| 3,888,193 | 6/1975 | Kishigami et al. | 110/245 |
| 3,897,739 | 8/1975 | Goldbach | 110/245 |
| 3,902,462 | 9/1975 | Bryers | 110/245 |
| 3,921,590 | 11/1975 | Mitchell et al. | 110/245 |
| 3,955,512 | 5/1976 | Martin et al. | 110/255 |
| 4,159,682 | 7/1979 | Fitch et al. | 110/245 |
| 4,235,174 | 11/1980 | Spurrell | 110/245 |
| 4,259,911 | 4/1981 | Jones | 110/245 |
| 4,287,838 | 9/1981 | Frosch | 122/4 D |

*Primary Examiner*—Henry C. Yuen
*Attorney, Agent, or Firm*—Arthur L. Wade

[57] ABSTRACT

A first atmospheric bubbling fluidized bed furnace is combined with a second turbulent, circulating fluidized bed furnace to produce heat efficiently from crushed solid fuel. The bed of the second furnace receives the smaller sizes of crushed solid fuel, unreacted limestone from the first bed, and elutriated solids extracted from the flue gases of the first bed. The two-stage combustion of crushed solid fuel provides a system with an efficiency greater than available with use of a single furnace of a fluidized bed.

6 Claims, 2 Drawing Figures

HYBRID FLUIDIZED BED COMBUSTER

TECHNICAL FIELD

The present invention relates to the combustion of crushed solid fuel in a plurality of fluidized beds. The invention further relates to the differential operation of the plurality of fluidized beds, with interrelated supplies of fuel and sulfur absorbent to obtain an overall efficiency greater than that possible with the operation of a single bed.

BACKGROUND ART

Intense efforts are being exerted by industry to extract thermal energy from the plentiful supplies of coal in the country. At present, the fluidized bed appears attractive.

There are two general types of fluidized beds in which to burn crushed coal. First, there is the atmospheric bubbling fluidized bed up through which combustion air flows at 6–12 ft./sec. Secondly, there is the turbulent, or circulating, fluidized bed which utilizes combustion air velocities of 15–35 ft./sec. Each of these beds has unique advantages and limitations.

The principle of a turbulent or circulating fluidized bed is well established and its operation has been previously demonstrated in alumina calcining plants and in other type chemical process plants. Development is going forward rapidly on this type of bed to adapt it for the combustion of coal for commercial application. There are high hopes that this type of bed will burn coal with high efficiency and have low emissions of $SO_2$. This system is peculiarly adapted to the combustion of small size coal (down to 500 mesh). The general advantage of this type fluidized bed is the achievement of high combustion efficiencies and the much lower limestone requirements for achieving high $SO_2$ removal. The disadvantage, at least in commercial size plants, is the very large size of separation equipment (cyclones) and furnace. These large sizes mean, of course, a higher cost of equipment, of structural steel, plant building size, and high air fan power.

Turning back to the atmospheric bubbling type of fluidized bed, its development thus far shows it to have certain advantages and disadvantages relative to the turbulent, or circulating, fluidized bed. Utilizing the lower velocity of combustion air (6–12 ft./sec.) the utilization of the limestone necessary to absorb the sulfur compounds within the coal has not been as efficient as hoped. The necessary weight ratio of calcium-to-sulfur hovers around the high value of 4:1 to reduce the $SO_2$ content of the combustion gas discharged to the atmosphere in meeting present environmental standards. However, this bed has an advantage in that it has the potential for being built in large sizes (one process unit) thereby having the potential for lower capital cost.

The present problem faced is how to combine the two types of beds to optimize the efficiency of coal combustion and limestone utilization, while keeping the capital cost of the equipment within a reasonable range.

The present system of fluidized bed operation should be staged with these two types to gain overall efficiency in the extraction of energy from solid fuel with this mode of combustion. Dividing the combustion of the coal and capture of the sulfur compounds into a plurality of operational stages appears attractive. Different conditions of combustion and absorption of sulfur compounds in the separate beds can be maintained and adjusted independent of each other to the gain of overall efficiency.

DISCLOSURE OF THE INVENTION

The present invention contemplates maintaining a fluidized bed of crushed coal and limestone of a first predetermined particle size. Predetermined finer particle size of the crushed coal and elutriated unburned fuel and limestone carried over with the combustion gases from the first fluidized bed are used in a second fluidized bed with the partially unused limestone discharged from the first fluidized bed as a result of maintaining a fixed first fluid bed depth.

The invention further contemplates operating the second bed at a combustion air velocity substantially greater than that of the combustion air velocity of the first fluidized bed.

The invention further contemplates the fresh crushed coal supply being screened and sending the coarse component to the first fluidized bed and sending the screened smaller size to the second fluidized bed in combination with elutriated fines mechanically separated from the combustion gases of the first fluidized bed.

Other objects, advantages and features of this invention will become apparent to one skilled in the art upon consideration of the written specification, appended claims, and attached drawings.

BRIEF IDENTIFICATION OF THE DRAWINGS

BEST MODE FOR CARRYING OUT THE INVENTION

Overall Plan

The present invention is embodied in a system which includes a furnace whose source of heat is an atmospheric bubbling fluidized bed burning crushed solid fuel. The bubbling fluidized bed is operated with combustion air flowed upward through the bed with a velocity of 6–12 ft./sec. Considering all of the problems of supplying crushed solid fuel and limestone to the bubbling bed, there are the additional problems of elutriation and recycling of the elutriated solids.

At the 6–12 ft./sec. velocity of fluidizing combustion air, a Ca/S mole ratio of at least 3:1 must be maintained in order to absorb 90% of the sulfur compounds generally found in coal as the solid fuel. Efficiency of the combustion of these bubbling beds is in the order of 97%.

The present invention enables an increase in overall combustion efficiency to 99%. The first modification in the system, to obtain this improvement, is the division of the combustion between the bubbling bed operation of furnace 1 and a turbulent bed furnace 2. The crushed fuel is graded by screens, the predetermined larger mesh size being supplied furnace 1 and all sizes smaller being supplied furnace 2.

Fuel will be maintained in furnace 2 and burned with an upflow of combustion air in the order of 15–35 ft./sec. The graded fuel supplied furnace 2 will be supplemented by recovery of elutriated fines from furnace 1. Limestone will be supplied from the drains of furnace 1. The combination of furnace 1 and furnace 2 gains the goal of high combustion efficiency while maintaining a relatively small size bubbling bed in furnace 1 and reducing the Ca/S mole ratio.

Fuel Grading

Figure 1:
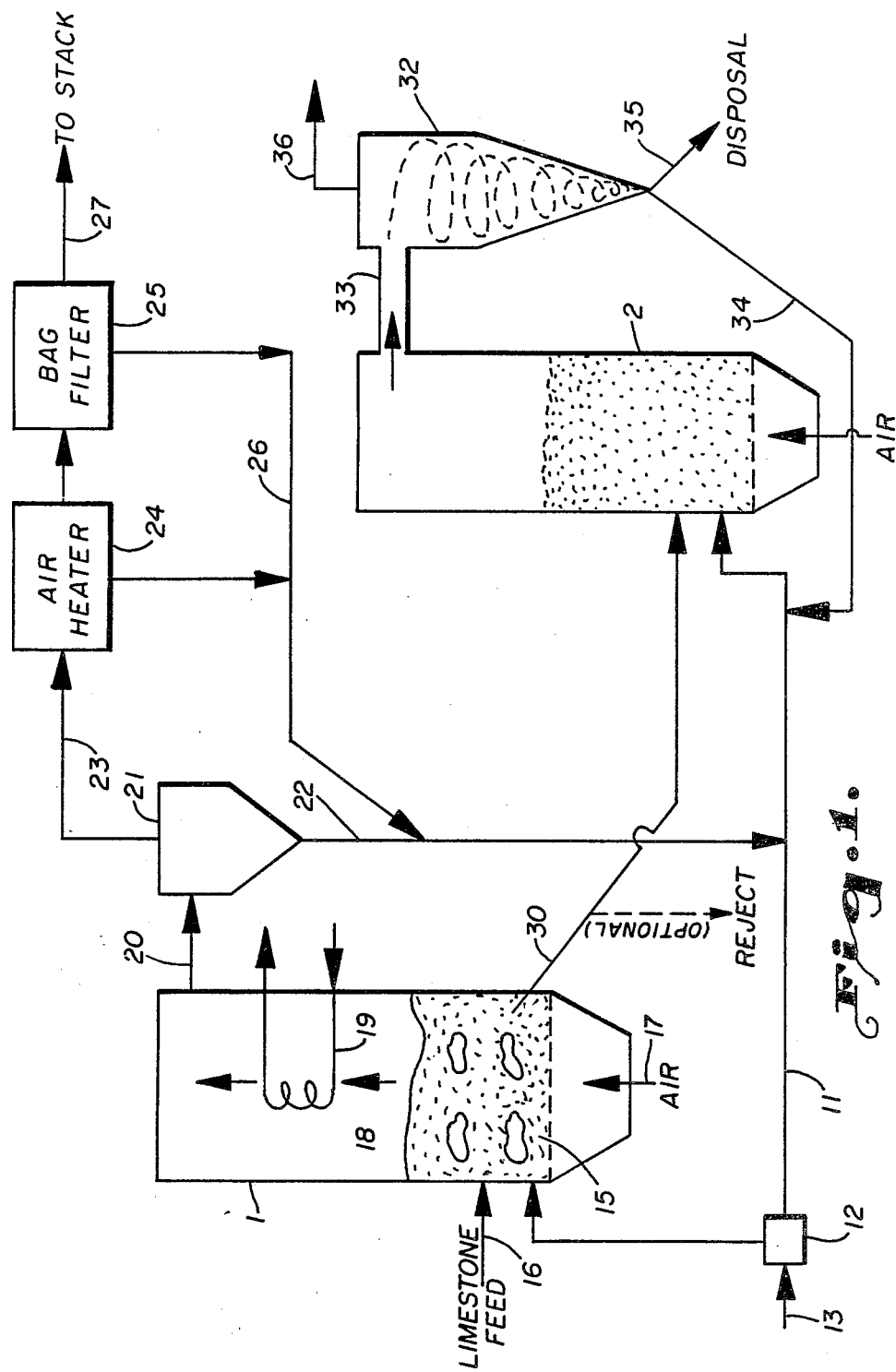
FIG. 1 is a somewhat schematic sectioned elevation of a complete system in which the present invention is embodied.

In FIG. 1, furnace 1 is shown being supplied its crushed solid fuel (coal) through conduit 10. Correspondingly, furnace 2 is supplied its crushed solid fuel through conduit 11. Screening unit 12 is indicated as receiving the total supply of crushed fuel through conduit 13. Screening unit 12 is arranged to double screen its crushed fuel supply and divert all the sizes of fuel above 300–400 microns to conduit 10 and all fines below that size to conduit 11. The crushed fuel is distributed through bed 15, in furnace 1, in the conventional manner, along with crushed limestone through conduit 16. Bed 15 is fluidized by combustion air supplied through conduit 17 at 6–12 ft./sec.

The combustion of bed 15 proceeds normally with the elutriation of fines into freeboard 18. The gaseous products of combustion from the bed transfer their heat to water circulated through heat exchange conduit 19 for the production of steam. The gaseous products of combustion and entrained fines are discharged from the upper portion of furnace 1 through conduit 20. A suitable form of mechanical cyclone separator is indicated at 21 for the extraction of fines which are routed downwardly through conduit 22. The remaining gaseous products of combustion, and entrained solids not removed by 21, are discharged through conduit 23. Additional fines are removed within air heater 24 and bag filter 25, their removed solids being recycled to conduit 22 through conduit 26. Finally, the gaseous products of combustion of furnace 1, stripped down to a solids content acceptable to environmental standards and cooled as much as practicable, are discharged to a stack through conduit 27.

Operation of Turbulent/Circulating Bed Furnace 2

Systemically, furnace 2 rides "piggyback" on furnace 1. Furnace 2 plays a backup role to furnace 1. Roughly, 20% of the total coal feed of conduit 13 is diverted as fines below 300–400 microns size, to furnace 2 by conduit 11. Additionally, the fines recovered by centrifuge 21 into conduit 22 may combine with the fuel of conduit 11 for their combustion in furnace 2. Also, limestone not fully utilized in bed 15 may be drained through conduit 30 into the combustion process of furnace 2.

The mechanical arrangement for physically bringing together the smaller size crushed fuel in conduit 11, the limestone in conduit 30, the elutriated and centrifuged fines in conduit 22, and the combustion air of conduit 31 is not disclosed in detail in FIG. 1. However, it is contemplated that the air will be passed up through furnace 2 at a substantially higher rate than the conventional velocity of combustion air fluidizing bed 15 of furnace 1. This velocity for furnace 2 is expected to be in the order of 15–35 ft./sec. FIG. 1 indicates conduits 11, 22 and 30 bringing their fuel and limestone into the bed supported on a perforated plate in the lower part of furnace 2, and the combustion air of conduit 31 is directed upwardly through the perforated plate.

Figure 2:
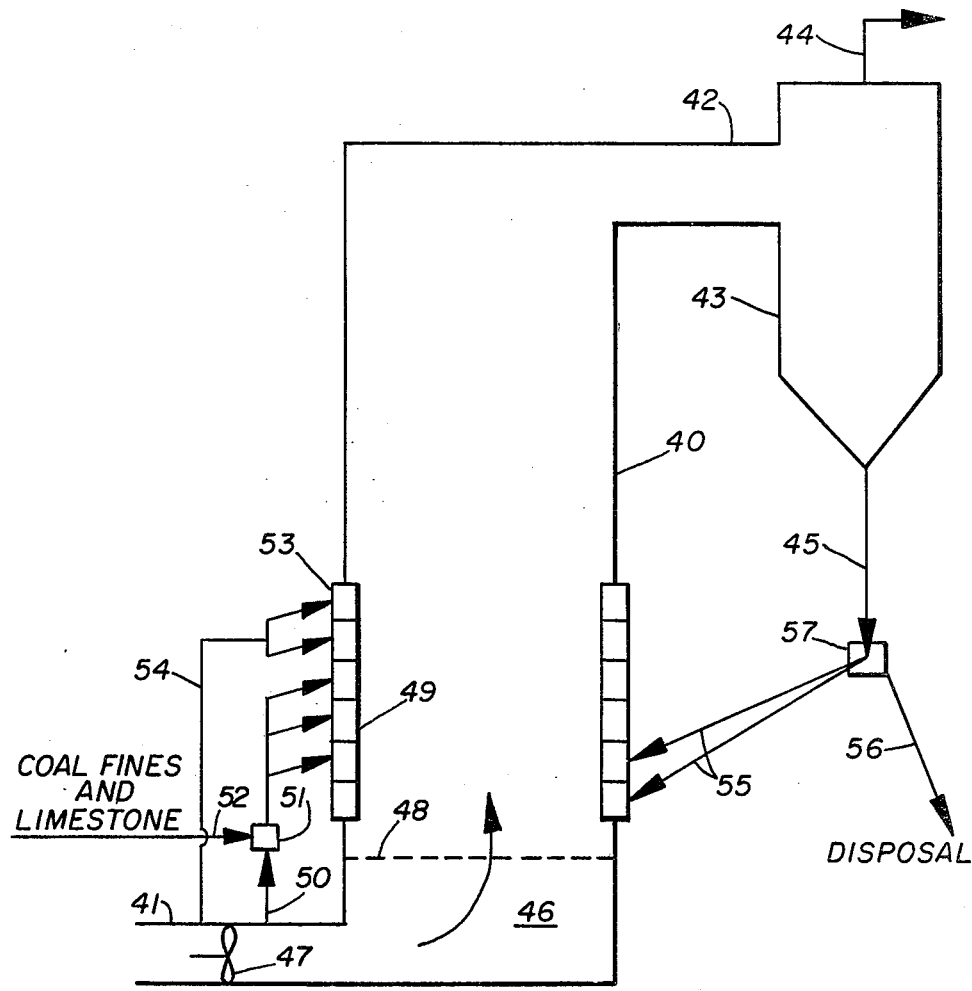
FIG. 2 is a sectioned elevation of a form of structure for the turbulent/circulating fluidized bed of FIG. 1.

A satisfactory, specific arrangement for bringing fuel, limestone, and air together into a feed for a turbulent bed furnace will be disclosed in FIG. 2. The furnace of FIG. 2 will represent the furnace 2 of FIG. 1 at an appropriate position in this disclosure.

The placement of heat exchangers in furnace 2, relative to the combustion within furnace 2, and the products of combustion in the freeboard space of furnace 2, may be quite different than the placement of heat exchange conduit 19 in furnace 1. This placement of heat exchangers must be compatible with the distribution of combustion between furnace 1 and furnace 2. The elutriation of solids from the combustion in furnace 2 may, also, require a downstream arrangement for mechanical separation. Therefore, a cyclone separator 32 is indicated as receiving the products of combustion and entrained fines from conduit 33. The solids from this separator 32 are withdrawn through conduit 34 and recycled to conduit 11, and/or disposed of through conduit 35 in order to maintain the desired inventory of solids in the overall system.

The hot clean combustion gases discharging from the cyclone 32 through conduit 36 may be used for additional steam generation. The gases may then be sent to the air heater 24 and bag filter 25 for further heat recovery and particulate removal before discharge to the stack through conduit 27.

FIG. 2 depicts a somewhat more specific arrangement of structure generally delineated for furnace 2 of FIG. 1. Furnace 40 is adapted to be placed in the position of furnace 2 so that the feed of fuel, air, and limestone from conduits 11, 22, 30 and 31 of FIG. 1 can be directed into the combustion zone within furnace 40. The combustion air is flowed into a plenum beneath furnace 40 by conduit 41. The fuel and limestone from conduits 11, 22 and 30 are induced by a small percentage of the combustion air for supply of the nozzles in windboxes mounted in the furnace 40. The products of the turbulent combustion within furnace 40 flow out the top of furnace 40 through conduit 42 and into cyclone 43.

The elutriated solid material of the turbulent combustion in furnace 40 is largely separated, the flu gas, stripped of most of its solid material, flowing out conduit 44. The fines are discharged from the bottom of cyclone 43. A conduit 45 is provided for this lower discharge.

Returning to the combustion air, flowed to furnace 40 through conduit 41, this air is pulled into plenum 46 by fan 47 and flowed up through distributor plate 48. Distributor plate 48 is extended below the turbulent combustion in furnace 40 and above the plenum chamber 46 to control the flow of air into the combustion propagated above the distributor plate.

Windboxes 49 are established in vertical array along the sides of the combustion chamber of furnace 40. The nozzles of these windboxes are supplied approximately 10% of the air induced from conduit 41 in which there has been mixed the fuel and limestone from conduits 11, 22 and 30 of FIG. 1. More specifically, conduit 50 is connected between air conduit 41 and air/solids inductor 51 with conduit 52 representing a connection with conduits 11, 22 and 30. Inductor 51 is depicted as distributing its air/solids mixture to each of the stacked windboxes 49. With the vertical arrangement of the windboxes discharging into the combustion of furnace 40, multiple levels of this combustion are established. An upper set of windboxes 53 are separately supplied air from conduit 41 through conduit 54 to provide a secondary over-fire air for the furnace 40 combustion.

The windboxes 49 can, also, be supplied the elutriated solids extracted by cyclone 43. Conduit 55 depicts this flow from the bottom of cyclone 43. As in FIG. 1, alternatively, the fines may be disposed of through conduit 56, the split being made by a valved mechanism 57.

Conclusion

The foregoing disclosure of the best mode for practicing this invention is, from one viewpoint, quite general. True, the concept of a combustion system combining two furnaces, operating under different conditions, is disclosed. One of the furnaces operates under the turbulent conditions of a throughput in the range of 15-35 ft./sec. It is an "add on" to a furnace in which a combustion is propagated by a bed fluidized at 6-12 ft./sec. Additionally, the more turbulent operation takes in the limestone which has not been completely reacted in the less turbulent bed, the finer sizes of crushed solid fuel, and the elutriated solids drawn from the more quiet operation. Further, heat is extracted from this material, giving the overall system a higher efficiency than the combustion in the quieter zones. Finally, the size of the furnace for the more quiet combustion can be kept to economical limits.

This system has been reduced to practice. A demonstration unit, designated TVA 200 MWe, has been successfully operated. A 22% reduction in limestone requirements was experienced, as compared with the same kind of unit with a carbon burnup cell. This reduction in limestone feed rate was based on 90% $SO_2$ removal requirements to meet EPA $SO_2$-emission standards. In addition, the proposed system reduces the required main bed area by about 14% (based on approximately 20% of the crushed coal feed fines being fed to the turbulent bed). Using the unreacted limestone of conduits 30 and 22, the turbulent bed provides a mole ratio of approximately 12:1 Ca/S.

From the foregoing, it will be seen that this invention is one well adapted to attain all of the ends and objects hereinabove set forth, together with other advantages which are obvious and inherent to the apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

The invention having been described, what is claimed is:

1. A system for burning solid fuel, including,
a first furnace in which is supported a fluidized bed of crushed solid fuel and limestone,
a supply of crushed solid fuel,
means for separating the supply of crushed fuel into a predetermined coarse size and a predetermined fine size,
a conduit connected to the separating means and the first furnace to supply the first furnace with the crushed fuel of predetermined coarse size,
a second furnace,
a conduit connected to the separating means and the second furnace to supply the second furnace with crushed fuel of predetermined fine size,
means connected to the first furnace to supply combustion air at a velocity within the range of 6-12 ft./sec.,
means connected to the second furnace to supply combustion air at a velocity within the range of 15-35 ft./sec.,
means connected to the first furnace to supply crushed limestone for absorption of sulfur compounds from the crushed fuel burned in the first furnace,
a conduit connected between the first and second furnaces for supplying the second furnace with incompletely utilized limestone drained from the first furnace,
and heat exchangers mounted in the furnaces to absorb their heat of combustion into water for the production of steam.

2. The system of claim 1, in which,
the means for separating the fuel includes screening structure which divides the crushed solid fuel into a first portion to the first furnace comprised of fuel particles greater than 400 microns and a second portion to the second furnace less than 400 microns.

3. The system of claim 2, including,
a mechanical separator connected to the first furnace to receive the products of combustion and solids elutriated from the combustion process in the first furnace and connected to the second furnace to deliver the separated solids to the combustion process in the second furnace.

4. The system of claim 3, including,
a mechanical separator connected to receive the discharged products of combustion and entrained solids elutriated from the combustion process in the second furnace and recycle the separated solids to the combustion process in the second furnace.

5. The system of claim 1, in which,
the second furnace is formed with a plenum chamber in its lower portion connected to the supply of combustion air,
and an air/solids inductor connected to receive substantially 10% of the combustion air supplied to the plentum chamber and mix the fuel with the combustion air for combustion in the second furnace.

6. The system of claim 5, in which,
the second furnace has burner boxes mounted through its sides with connections to the air/solids inductor through which the fuel and air mixture is supplied to the combustion.

* * * * *

UNITED STATES PATENT AND TRADEMARK OFFICE
CERTIFICATE OF CORRECTION

PATENT NO. : 4,325,327
DATED : April 20, 1982
INVENTOR(S) : Prabhudas P. Kantesaria and Francis T. Matthews It is certified that error appears in the above—identified patent and that said Letters Patent is hereby corrected as shown below:

Column 1, line 5, insert as the first paragraph following "TECHNICAL FIELD" --The government of the United States of America has rights in this invention pursuant to contract No. EX-76-C-01-2473 awarded by the U.S. Energy Research and Development Administration.--.

Column 4, at lines 29, 44 and 47, change "plentum" to --plenum--.

Signed and Sealed this

Fourteenth Day of September 1982

[SEAL]

Attest:

GERALD J. MOSSINGHOFF

Attesting Officer

Commissioner of Patents and Trademarks